Nov. 7, 1961 — O. R. NEMETH — 3,008,070
ROTARY SOLENOID

Filed May 19, 1958 — 3 Sheets-Sheet 1

INVENTOR.
OTTO R. NEMETH
BY Elliott & Pastoriza
ATTORNEYS

Nov. 7, 1961     O. R. NEMETH     3,008,070
ROTARY SOLENOID

Filed May 19, 1958     3 Sheets-Sheet 2

*INVENTOR.*
OTTO R. NEMETH
BY Elliott & Pastoriza
·ATTORNEYS·

Nov. 7, 1961     O. R. NEMETH     3,008,070
ROTARY SOLENOID
Filed May 19, 1958     3 Sheets-Sheet 3
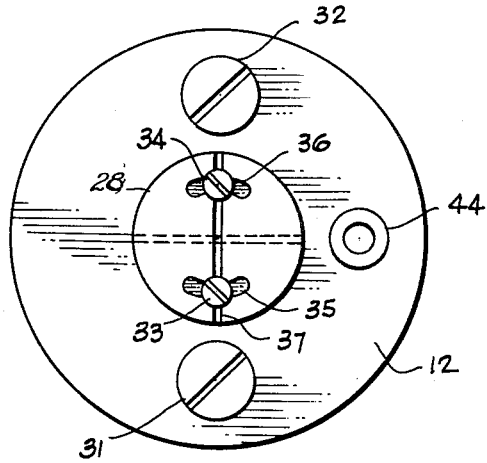
FIG. 3.
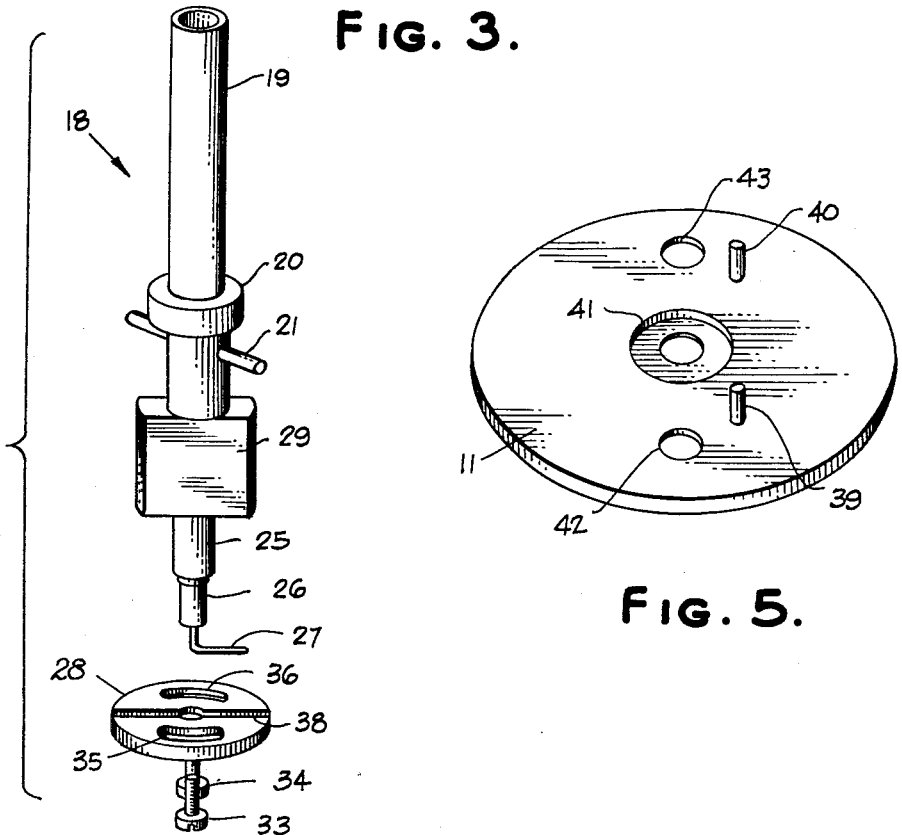
FIG. 5.
FIG. 4.
INVENTOR.
OTTO R. NEMETH
BY Elliott & Pastoriza
·ATTORNEYS·

United States Patent Office 3,008,070
Patented Nov. 7, 1961

3,008,070
ROTARY SOLENOID
Otto R. Nemeth, Los Angeles, Calif.
(537 San Vicente Blvd., Santa Monica, Calif.)
Filed May 19, 1958, Ser. No. 736,270
2 Claims. (Cl. 317—176)

This invention generally relates to rotary electromechanical actuators and more particularly concerns a rotary solenoid primarily designed for aircraft and missile applications.

Although rotary solenoids, as such, are well known in the art, aircraft and missile requirements have created an unfulfilled demand for a reliable, rugged, and economically constructed rotary solenoid which will withstand extreme shock and vibration as well as unusual multidirectional acceleration loads.

It is, therefore, an object of the present invention to provide a rotary solenoid which has a completely balanced construction so as to inherently present resistance to extremes of shock and vibration as well as excessive acceleration loads.

Another object of the present invention is to provide a rotary solenoid which may be readily modified for bi-directional movement while still maintaining minimum overall dimensions and weight.

Another object of the present invention is to provide a rotary solenoid which may be simply and economically constructed as a self-contained unit, and yet which requires only a relatively few structural parts.

A still further object of the present invention is to provide a rotary solenoid which may be readily adaptable to a range of torque load requirements.

These and other objects and advantages of the present invention are generally achieved by providing a rotary solenoid comprising a shaft which has integrally formed therewith an armature member. The armature is disposed in axial alignment with the shaft, and, of course, is designed to rotate therewith. Electromagnetic means are positioned so as to effect angular movement of the armature from a first position to a second position. In addition, force means are coupled to the shaft or act upon the shaft so as to bias the armature towards the first position.

With this type of construction, upon energization of the electromagnetic means, the armature is forced to move from the first position to the second position and in turn cause movement of the shaft through a given angle of rotation. Upon de-energization of the electromagnetic means or upon a given decrease of the applied electromagnetic force, the spring means serves to return the shaft and armature to the de-energized or first position.

A better understanding of the present invention will be had by reference to the drawings, illustrating merely one preferred embodiment, and in which:

FIGURE 3 is a bottom elevational view of the rotary solenoid of the present invention taken in the direction of the arrows 3—3 of FIGURE 2;

FIGURE 4 is an isometric view of the armature and shaft assembly and the holding means to which the force biasing means is coupled;

FIGURE 5 is an inverted isometric view of the upper cover or cap shown in FIGURE 2.

Figure 1:
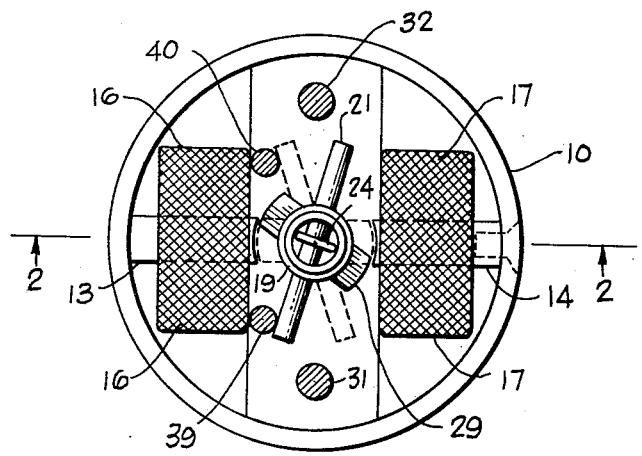
FIGURE 1 is a top elevational view of the rotary solenoid according to the present invention with the upper cover or cap removed from the casing thereof, the armature being disposed in its normal or de-energized position.
Figure 2:
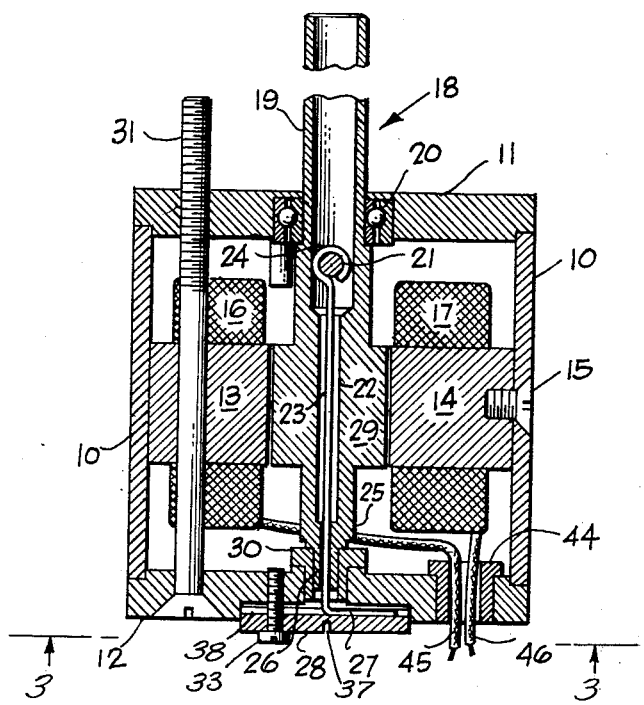
FIGURE 2 is a longitudinal sectional view of the rotary solenoid of FIGURE 1 taken in the direction of the arrows 2—2 thereof with one of the mounting screws and one of the stop pins being shown in a different position for illustrative purposes. Furthermore, the armature has been shown in its energized position.

Referring now to the drawings, there is shown in FIGURE 1 and FIGURE 2 (in which the same numerals are used to denote similar parts) a cylindrical casing or shell 10 which is adapted to receive an upper cover or cap 11 and a lower cover or cap 12.

The casing 10 has disposed therein diametrically opposed pole pieces 13 and 14 which are secured, respectively, to the sidewalls of the casing 10 as with set screws 15. As will be noted in FIGURE 2, only one such screw 15 is shown, for example, coupling pole piece 14 to the inner sidewalls of the casing 10 and an identical set screw 15 would also be employed in connection with pole piece 13. Encircling the pole piece 13 is a coil 16; similarly disposed around the pole piece 14 is a coil 17.

Axially extending through the casing 10 is a shaft and armature assembly generally designated by the numeral 18, which includes an upper shaft portion 19 extending from the unit and adapted to actuate the particular components to which the rotary solenoid is applied. The shaft 19 is hollow and is positioned for rotation within a bearing 20 disposed in the upper cap 11. The shaft 19 has a pin extending radially therethrough, as will be more clearly seen from the view of FIGURE 1, which functions for a dual purpose which will become clear as the specification proceeds.

Proceeding downwardly in the view of FIGURE 2, the shaft 19 includes a decreased diameter bore 22 designed to accommodate an elongated torsion spring wire or rod 23. The torsion spring 23 is provided at its upper end, as viewed in FIGURE 2, with a loop 24 positioned within the upper portion of the shaft 19 and designed to encircle the pin 21 as it extends through the shaft 19. At its lower end the shaft 19 includes a decreased diameter portion 25 and a further stepped down portion 26. The spring 23 extends down through the portions 25 and 26 to finally terminate in an arm 27 retained within anchoring or holding means in the form of a disc 28 to be further described.

The assembly 18 includes as an integral part thereof an armature 29 which has radiused or convex end surfaces designed to magnetically co-operate with the concave inner surfaces of pole pieces 13 and 14.

In order to retain with stability the assembly 18 at its lower end, as viewed in FIGURE 2, the stepped portion 26 is journaled within a bearing member 30, the latter being positioned within the lower cap or cover 12.

For mounting purposes, screws 31 and 32 extend lengthwise through the casing 10 and have their exposed ends threaded for coupling to the apparatus in which the rotary solenoid is employed. For purposes of illustration, one of the mounting screws 31 of FIGURE 1 has been shown in a different location in FIGURE 2, although the location of the mounting screws is not critical so long as they do not interfere with the structure or operation of the solenoid.

The spring holding means or disc 28 is retained in the lower cover member 12 by a pair of adjustment screws 33 and 34, as will be more clearly seen from the views of FIGURE 3 and FIGURE 4. The disc 28 is provided with a pair of arcuate grooves 35 and 36 which are designed to receive screws 33 and 34, respectively, and to enable limited angular movement of the disc 28 for torque adjusting purposes. The disc 28 is further provided with a diametrical slot 37 on its outer surface to enable screw driver adjustment thereof. In addition, the disc 28 is provided with a groove 38 on its inner surface to receive and retain the spring arm 27 of the torsion member 23 previously described. Thus, by locking or keeping the arm 27 in the groove 38 and rotating the disc 28 a given number of revolutions (if a high biasing force is required), the return force of the torsion spring 23 may be varied. Of course, in addition a more precise variation is possible by moving the disc 28 throughout the limit of the angles subtended by the arcuate grooves 35 and 36 before the set screws 33 and 34 are tightened to lock the anchor disc 28 in place.

Referring now to FIGURES 1 and 5, it will be noted that the upper cover 11 is provided with two downwardly extending spaced pins 39 and 40 which form stop means or structures limiting the movement of the shaft and armature assembly 18 by their respective engagement with the pin 21. Thus, the pin 21 serves not only the function of retaining the torsion spring member 23 by its position within the loop 24 thereof, but also serves to limit angular movement of the shaft and armature assembly between two given positions angularly spaced apart. In the position of FIGURE 1, the armature 29 is shown in its de-energized or normal position with the pin 21 abutting against the stop member 39. Upon energization of the coils 16 and 17, the armature 29 will be forced to rotate counter clockwise to a work-stroke position such that it will be aligned with the pole pieces 13 and 14 and the pin 21 will come into abutting relationship with the stop member 40. Of course, as soon as the coils 16 and 17 have been de-energized to such an extent that biasing force of the spring 23 is greater, the armature and shaft assembly 18 will be forced to return to the de-energized or neutral position as shown in FIGURE 1.

The upper cover or cap 11 is further provided with a central circular recess 41 adapted to receive the bearing 20. Apertures 42 and 43 are included to accommodate screws 31 and 32 previously described.

The lower cap or cover 12 further includes a bore provided with a grommet 44 through which leads 45 and 46 extend for electrical connection, respectively, with coils 16 and 17. The energization of leads 16 and 17 may, of course, be effected by any source of electrical power or circuitry according to the particular application. For this reason, the source of power has not been indicated.

It will be appreciated from the foregoing that the rotary solenoid of the present invention is completely balanced and inherently embodies a rugged and simple construction designed for long, maintenance-free life and reliable performance regardless of unusual environmental conditions which may be imposed upon it. Furthermore, it will be apparent that the unit is adaptable to varying torque requirements as well as bi-directional operation.

Figure 6:
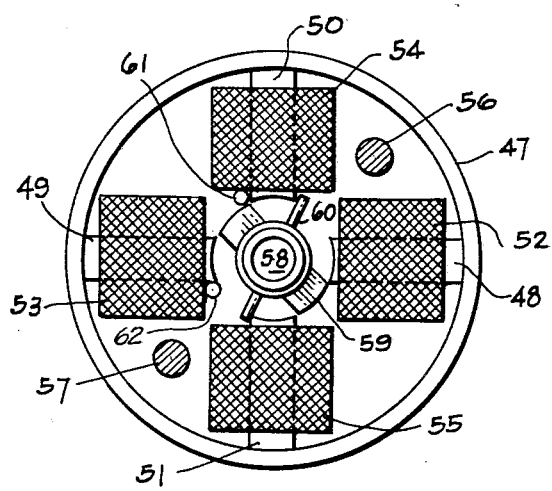
FIGURE 6 is a modification of the rotary solenoid of the present invention; and, FIGURE 7 is another modification of the rotary solenoid of the present invention.

In FIGURE 6, a modification has been shown to the rotary solenoid of the present invention enabling it to be used for bi-directional work-stroke operation. In the construction of FIGURE 6, a casing 47 has pole pieces 48, 49, 50, and 51 connected to it in an analogous design to the pole pieces shown in FIGURE 1. However, in the view of FIGURE 6 four different pole pieces are used spaced forty-five degrees apart around the inner surface of the casing 47. Disposed about the respective pole pieces are coils 52, 53, 54, and 55. Mounting screws 56 and 57 extend axially throughout the unit.

A shaft 58 is provided which embodies an armature 59. The shaft has coupled thereto an arm or pin 60 adapted to be limited in angular movement by stop pins 61 and 62. Thus, in the position shown in FIGURE 6, the armature 59 is in a neutral or first position. Upon energization of the coils 52 and 53, the armature will swing to a horizontal position in FIGURE 6 such that it will be aligned with pole pieces 48 and 49 with the pin 60 coming into engagement with the stop pin 61. Similarly, upon energization of coils 54 and 55, the armature 59 will swing into alignment with pole pieces 50 and 51 with the pin 60 coming into abutment with stop pin 62. Thus, the unit will function identically to the solenoid in conjunction with FIGURE 1 except that the unit of FIGURE 6 is adapted to bi-directional operation.

Figure 7:
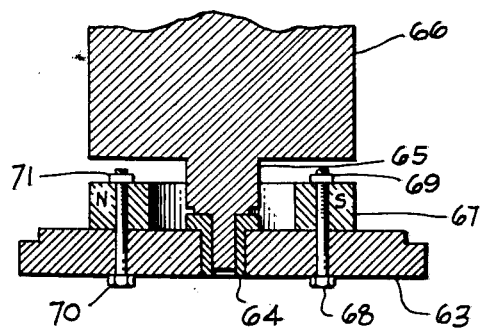

In the view of FIGURE 7, a different force means has been shown for returning the armature to its original normal position. Thus, in FIGURE 7 there is shown a lower cap 63 which may be provided with a bearing 64 to accommodate a shaft 65 in which is incorporated an armature 66.

Connected to the lower cap 63 is an annular permanent magnet 67 which may be coupled to the cap 63 as with a bolt 68 and nut 69, and another bolt 70 and nut 71. The magnet is designed, as by slotting (not shown) so that the N–S polarity is transverse to the longitudinal axis of the armature as indicated.

With such a construction, the armature 66 will normally be disposed in an angular position between the pole pieces employed such that the magnetic force of the magnet 67 will tend to maintain it in such a position. Upon energization of the electromagnetic means, the armature 66 will be forced to move and overcome the biasing force of the magnet 67; however, upon release or de-energization of the electromagnetic means employed, the armature 66 will be returned to its normal magnetic alignment with the magnet 67. Variations in the magnetic force imposed by the magnet 67 may be achieved by merely shimmying up the shaft 65 from the bearing 64 in a conventional manner.

It is, therefore, evident that these and many other modifications and changes may be made in the rotary solenoid of the present invention without departing from the spirit and scope of the claims hereinafter set forth.

What is claimed is:

1. A rotary solenoid comprising a casing, a hollow actuator shaft journaled within said casing, an armature mounted on said shaft in axial symmetrical alignment therewith, electro-magnetic means positioned in said casing with respect to said armature so as to effect rotative movement of said armature and shaft from a neutral position to a work-stroke position, resilient means connected to said shaft acting in opposition to said electro-magnetic means to bias and return said armature to said neutral position upon completion of the work-stroke comprising a torsion rod extending axially through said shaft and having one end coupled thereto for rotary movement with the armature and shaft, and means for anchoring the other end of said torsion rod to one end of said casing so that it is fixed with respect to movement of the armature and shaft, said anchoring means comprising a rotatably adjustable disk, said disk having an elongated opening in combination with securing means connected to the casing for permitting limited rotation of said disk for adjusting the initial torsional stress on the rod, said disk also having key-like structure for receiving in detachable engagement a corresponding extension of said rod.

2. A rotary solenoid comprising a casing, a hollow actuator shaft journaled within said casing, an armature mounted on said shaft in axial symmetrical alignment therewith, electro-magnetic means positioned in said casing with respect to said armature so as to effect rotative movement of said armature and shaft from a neutral position to a work-stroke position, resilient means connected to said shaft acting in opposition to said electro-magnetic means to bias and return said armature to said neutral position upon completion of the work-stroke comprising a torsion rod extending axially through said shaft and having one end coupled thereto for rotary movement with the armature and shaft, the coupling comprising a pin extending transversely of and through said shaft for also cooperating with said casing as a limit-stop; and means for anchoring the other end of said torsion rod to one end of said casing so that it is fixed with respect to movement of the armature and shaft, said anchoring means comprising a rotatably adjustable member secured to said casing at said end for varying the initial torsional stress on said torsion rod.

References Cited in the file of this patent

UNITED STATES PATENTS

| | | |
|---|---|---|
| 2,499,632 | Coake | Mar. 7, 1950 |
| 2,693,553 | Wells et al. | Nov. 2, 1954 |
| 2,767,357 | Naybor | Oct. 16, 1956 |
| 2,881,365 | Bernstein | Apr. 7, 1959 |
| 2,905,871 | Martin | Sept. 22, 1959 |
| 2,945,932 | Nemeth | July 19, 1960 |